United States Patent [19]
Murray

[11] Patent Number: 5,419,577
[45] Date of Patent: May 30, 1995

[54] EXTENDABLE TRAILER FOR HAULING RAILROAD EQUIPMENT

[75] Inventor: David H. Murray, Stockton, Calif.

[73] Assignee: Harley Murray, Inc., Stockton, Calif.

[21] Appl. No.: 168,821

[22] Filed: Dec. 16, 1993

[51] Int. Cl.6 .......................... B60P 3/06; B60P 1/43; B62D 21/14; B62D 21/20

[52] U.S. Cl. .................................. 280/656; 280/789; 414/480; 414/481

[58] Field of Search ...................... 280/656, 789, 441.2; 414/480, 481, 482, 483, 484, 485, 477, 474; 105/355

[56] References Cited

U.S. PATENT DOCUMENTS

| | | | |
|---|---|---|---|
| 1,835,133 | 12/1931 | Bergen, Jr. | 414/340 |
| 2,127,972 | 8/1938 | Hutchinson et al. | 414/343 |
| 3,301,416 | 1/1967 | Boop | 414/543 |
| 3,406,980 | 10/1968 | Murray | 280/656 |
| 3,467,408 | 9/1969 | Regalia | 280/656 |
| 3,556,545 | 1/1971 | VanRaden | 280/656 |
| 3,697,098 | 10/1972 | Fisher | 280/415.1 |
| 3,698,734 | 10/1972 | Drake | 280/656 |
| 3,967,743 | 7/1976 | Yoder | 414/495 |
| 4,119,224 | 10/1978 | Moody | 280/656 |
| 4,358,133 | 11/1982 | Stucky | 280/656 |
| 4,373,857 | 2/1983 | Giles | 414/481 |
| 4,412,699 | 11/1983 | Peruzzi | 280/656 |
| 5,088,873 | 2/1982 | Ruder et al. | 414/543 |
| 5,246,330 | 9/1993 | Marmur et al. | 414/480 |

FOREIGN PATENT DOCUMENTS

| | | | |
|---|---|---|---|
| 1076279 | 10/1954 | France | 414/480 |
| 0350585 | 6/1931 | United Kingdom | 414/481 |

Primary Examiner—Margaret A. Focarino
Assistant Examiner—Peter C. English
Attorney, Agent, or Firm—Flehr, Hohbach, Test, Albritton & Herbert

[57] ABSTRACT

Trailer having a main frame with a horizontally extending deck and a pair of longitudinally extending rails spaced a predetermined distance apart for receiving flanged wheels of railroad equipment, and a laterally extensible rear subframe assembly connected to the main frame for movement between different widths for different loads. The subframe assembly has a pair of longitudinally extending rail members which can be aligned with the rails on the main frame to form an extension of those rails.

12 Claims, 5 Drawing Sheets

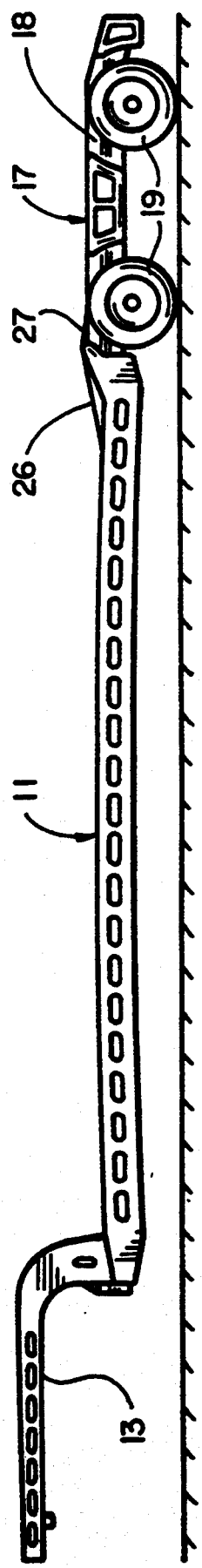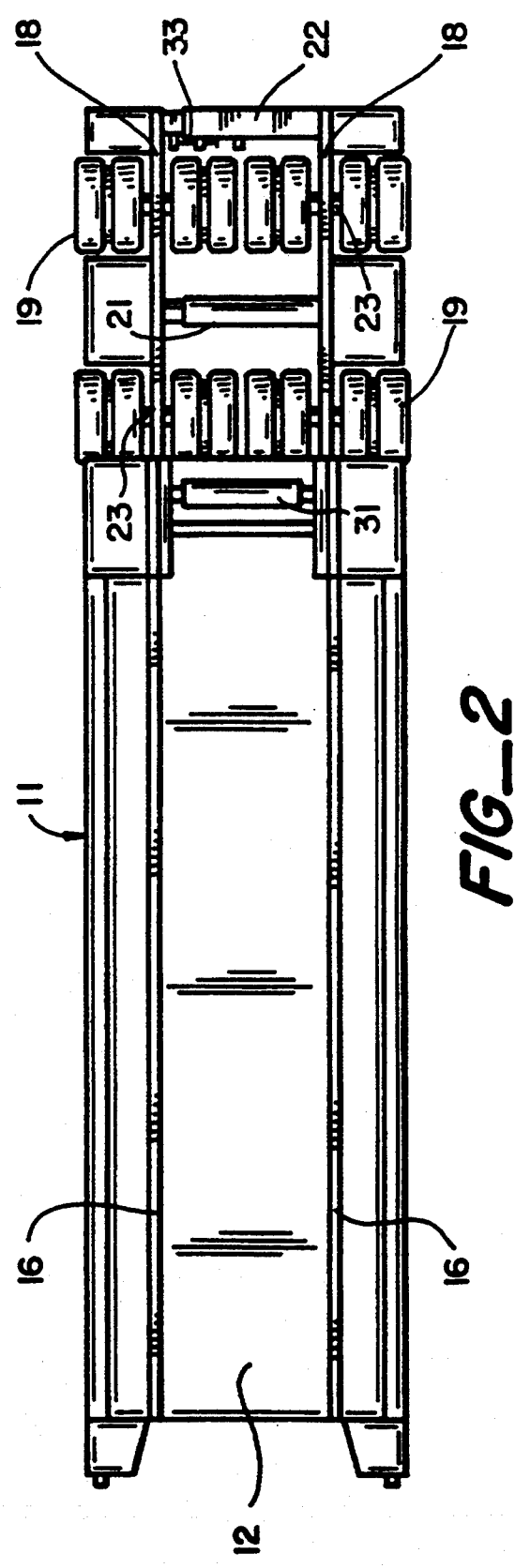

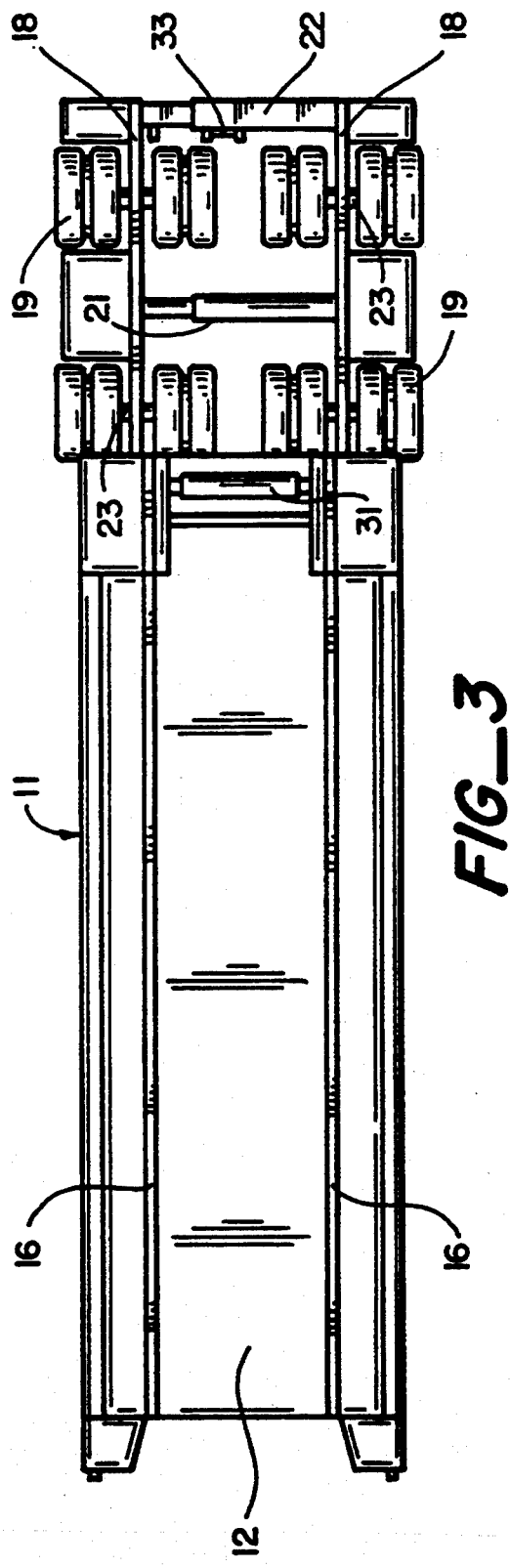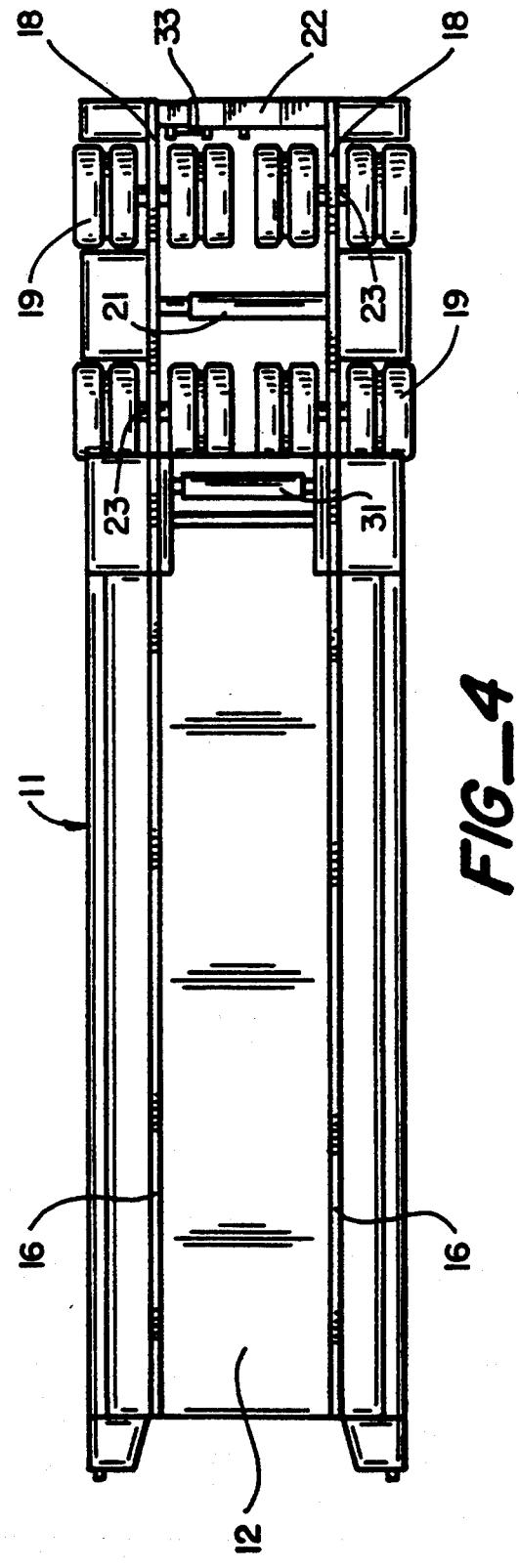

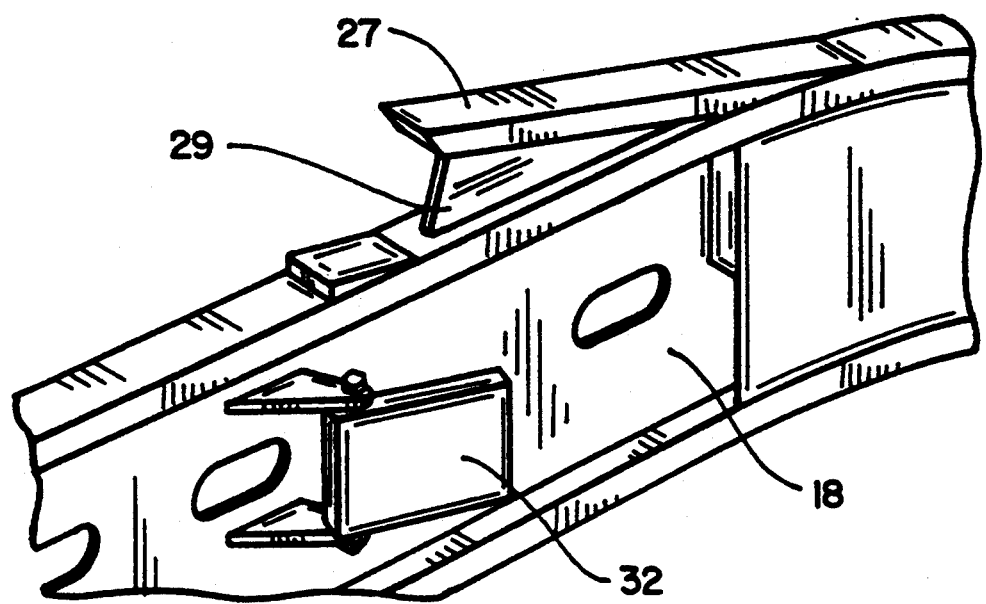
FIG_5
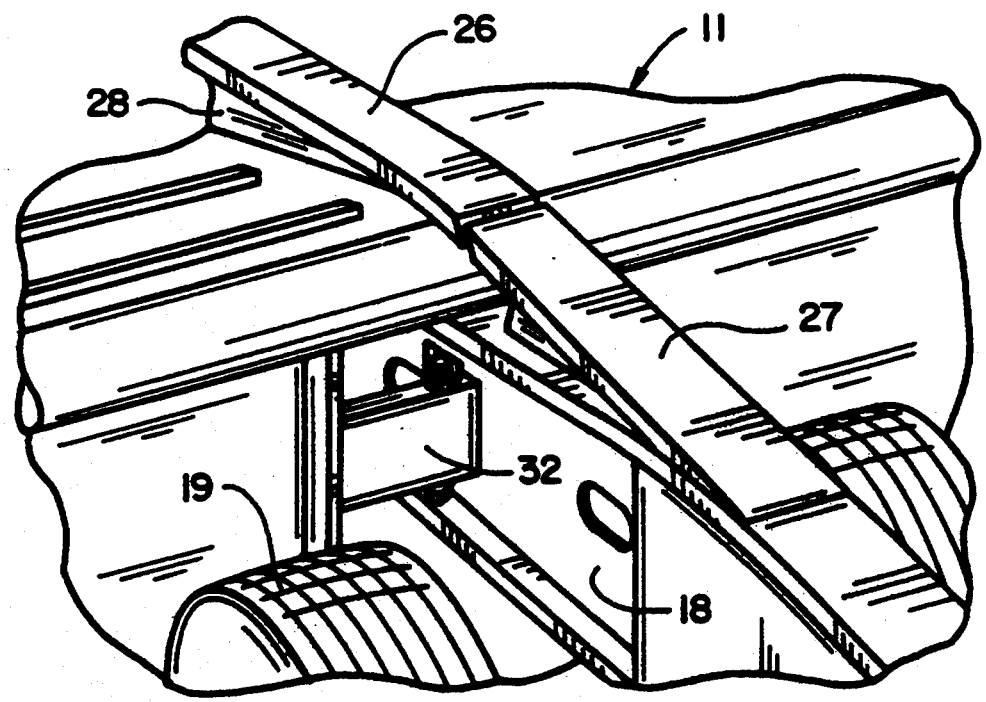
FIG_6

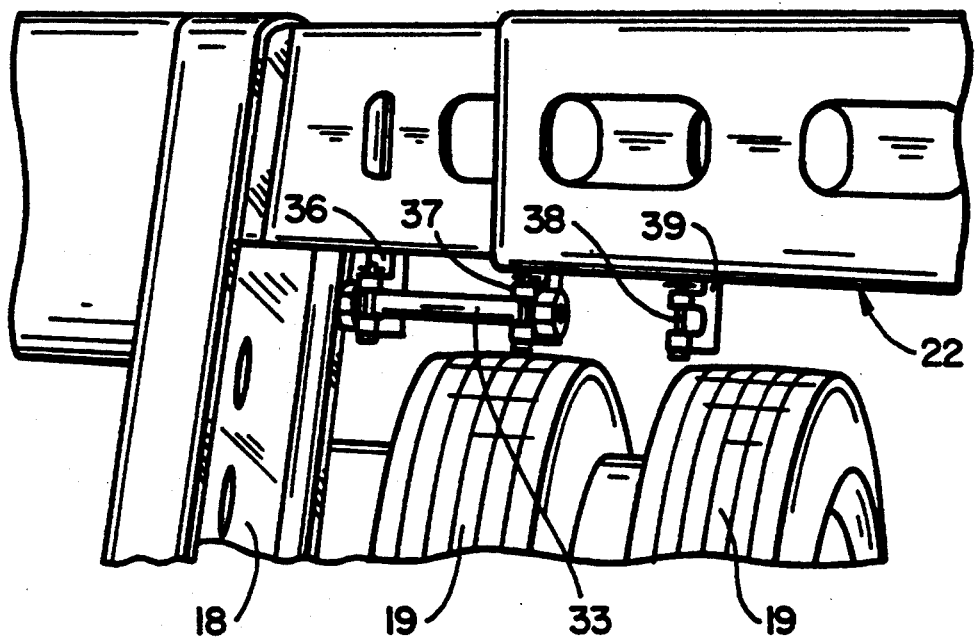
FIG_7
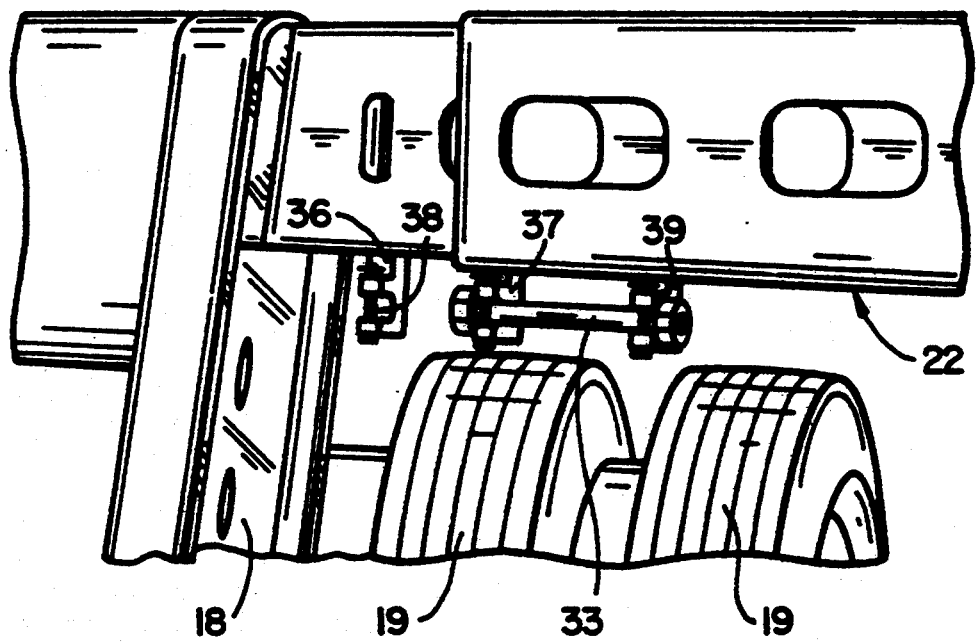
FIG_8

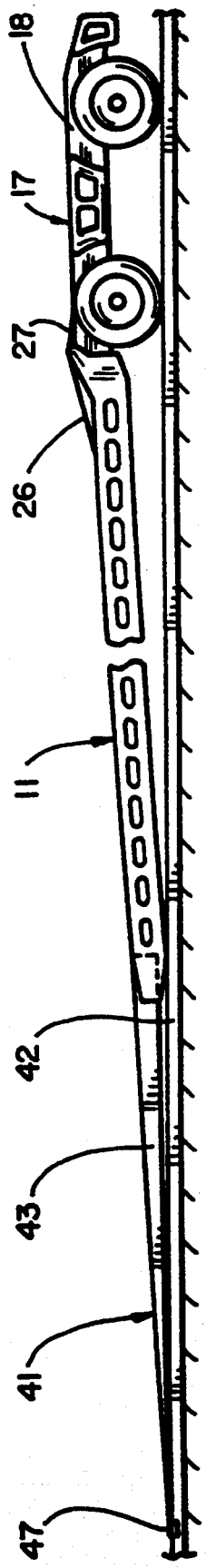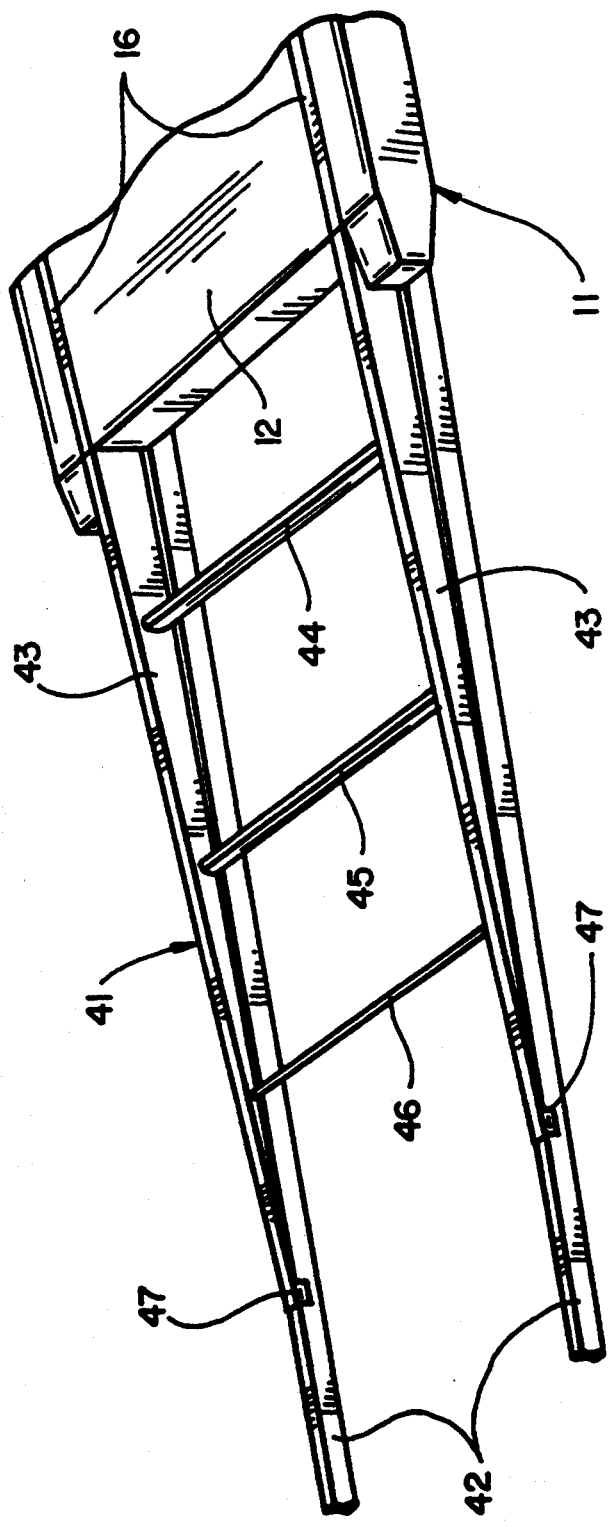

EXTENDABLE TRAILER FOR HAULING RAILROAD EQUIPMENT

This invention pertains generally to trailers for hauling heavy equipment and, more particularly, to a trailer which can be utilized for hauling both railroad equipment which has flanged wheels and other equipment which does not have flanged wheels.

U.S. Pat. No. 3,406,980 describes an extendable trailer having a rear subframe assembly with wheels which can be set to different widths to accommodate different loads. Such trailers are most commonly used for hauling heavy equipment such as bulldozers, excavators and loaders.

It is also sometimes desirable to haul certain railroad equipment such as tampers, cranes, ballast regulators, and snow plows over highways and other roads rather than moving them by rail. One technique for loading such equipment onto a trailer is to pick the equipment up with a crane and set it down on the deck of the trailer. This requires the use of a relatively large crane both for loading and for unloading, and has the limitations and disadvantages attendant thereto.

It is in general an object of the invention to provide a new and improved trailer for hauling railroad equipment with flanged wheels and other equipment without flanged wheels.

Another object of the invention is to provide a trailer of the above character which overcomes the limitations and disadvantages of the prior art.

These and other objects are achieved in accordance with the invention by providing a trailer having a main frame with a horizontally extending deck and a pair of longitudinally extending rails spaced a predetermined distance apart for receiving flanged wheels of railroad equipment, and a laterally extensible rear subframe assembly connected to the main frame for movement between different widths for different loads. The subframe assembly has a pair of longitudinally extending rail members which can be aligned with the rails on the main frame to form an extension of those rails.

FIG. 1 is a side elevational view of one embodiment of a trailer incorporating the invention.

FIGS. 2–4 are top plan views of the embodiment of FIG. 1, with the gooseneck removed, showing the rear subframe assembly set to different widths for hauling different loads.

FIGS. 5 and 6 are fragmentary isometric views of the embodiment of FIG. 1, illustrating a gauge block which sets the rear subframe assembly to an intermediate width for hauling railroad equipment.

FIGS. 7 and 8 are enlarged fragmentary top plan views of the embodiment of FIG. 1, illustrating a stop rod which sets the rear subframe assembly to an intermediate width for hauling railroad equipment.

FIG. 9 is a side elevational view of the embodiment of FIG. 1 with an inclined ramp assembly in position for loading and unloading railroad equipment.

FIG. 10 is a fragmentary isometric view of the inclined ramp assembly in the embodiment of FIG. 9.

As illustrated in the drawings, the trailer includes a main frame 11 with a horizontally extending deck 12 for receiving the equipment or load to be carried. A detachable gooseneck 13 is connected to the front portion of the main frame for connecting the trailer to a pulling vehicle. The gooseneck is of known design and can, for example, be of the type shown in U.S. Pat. No. 3,326,572. The means for connecting the gooseneck to the main frame or deck section is likewise of known design, and one suitable example of such means is shown in U.S. Pat. No. 3,326,572.

A pair of rails 16 extend longitudinally of the deck section for receiving the flanged wheels of railroad equipment. The deck is typically fabricated of wood, and the upper surfaces of the rails are set flush with the upper surface of the wood. The rails are fabricated of steel bar having a width on the order of 2–4 inches and a height on the order of one inch. The rails extend substantially the entire length of the deck section and are spaced with their inner edges 56½ to 56⅝ inches apart to accommodate standard gauge railroad equipment. The wood is left out of an area approximately 1½ inches wide and one inch deep along the inner edge of each rail to accommodate the lips or flanges on the wheels.

The rear portion of the main frame is supported by a subframe assembly 17 which has a pair of longitudinally extending frame members 18 supported by ground engaging wheels 19. The frame members are connected together by telescoping cross members 21, 22 which permit the width of the assembly to be adjusted for different loads. The wheels are mounted in groups of four on separate axles 23 connected to the two frame members, and changing the width of the subframe assembly changes the track of the wheels as well as the spacing between the frame members. In one presently preferred embodiment, the subframe assembly can be set to a narrow width for lighter loads in which the wheel track (i.e., the distance between the outer sides of the outer wheels on opposite sides of the trailer) is 108 inches and a wide width for heavier loads in which the wheel track is 120 inches.

The subframe assembly can also be set to an intermediate width in which the wheel track is 112 inches and frame members 18 are aligned longitudinally with the rails 16 on the deck section of the trailer. In this position, the frame members serve as rail member as extensions of the rails for receiving railroad equipment carried by the trailer. This makes it possible for the wheels of the railroad equipment to rest upon the rear subframe assembly and enables the trailer to haul equipment having a longer wheelbase than would be possible with just the rails in the deck section.

Frame members 18 are fabricated of steel I-beams and slope downwardly toward their front and rear ends from a generally horizontal central section. The front portions of the frame members extend beneath the rear portion of the deck and are connected to the main frame in a manner providing vertical rigidity for load carrying purposes, while permitting lateral adjustment of the frame members relative to the main frame. One suitable example of this type of connection is illustrated in detail in U.S. Pat. No. 3,406,980.

Bridge rails 26, 27 provide a smooth transition between rails 16 and the upper surfaces of frame members 18 when the subframe assembly is positioned for carrying rail equipment. The bridge rails are mounted on top of the end portions of rails 16 and frame members 18 and come together at the rear of the main frame. In the embodiment illustrated, the main frame rises somewhat at the rear of the deck, and the bridge rails are inclined in an upward direction to accommodate this rise, with the inner end portions of the bridge rails being tapered to provide smooth transitions with the upper surfaces of the deck rails and frame members. Vertical support for the bridge rails is provided by tapered flanges or webs 28, 29 positioned beneath those rails.

An actuator 31 such as a double acting pneumatic cylinder is connected between frame members 18 for moving the subframe assembly between its narrow and wide positions. Those positions are defined by stops (not shown) which limit inward and outward travel of the telescoping cross members.

Means is also provided for setting the subframe assembly in the intermediate position in which frame members 18 are aligned with rails 16. This means includes gauge blocks 32 located toward the front ends of the frame members and a stop rod 33 mounted on the rear cross member 22.

Gauge blocks 32 are pivotally mounted on the outer sides of the frame members for movement about vertical axes between a laterally extended position shown in FIG. 6 and a retracted shown in FIG. 5. In the extended position, the blocks abut against the main frame, limiting outward travel of the frame members. In the retracted position, the blocks extend longitudinally and are positioned substantially flat against the web portions of the frame members where they do not interfere with the outward travel of the frame members.

Stop rod 33 is removably mounted in blocks 36, 37 which are affixed to the two sections of cross member 22. These blocks are open on the top, and the rod is retained in the openings by pins 38. The rod has enlarged portions at its two ends which bear against the blocks to limit outward travel of the frame members. In the embodiment illustrated, the rod consists of a bolt and nut, which provides simple but effective means for adjusting the length of the rod to provide the proper spacing between the frame members for the gauge of the railroad tracks. An additional block 39 is mounted on one section of the cross member for storage of the rod when the subframe assembly is to be set in its widest position. In the storage position, which is illustrated FIG. 8, the rod is mounted in blocks 37 and 39.

An inclined ramp assembly 41 is attached to the front end of the deck section for transferring equipment between the trailer and railroad tracks 42. This assembly comprises a pair of tapered rail sections 43 which are attached to the front of the deck section in alignment with rails 16 and the track rails. Cross members 44-46 are connected between the tapered rails for stability, and tabs 47 at the outer ends of the tapered rails fit over the track rails to hold the tapered rails in proper alignment with the track rails.

Operation and use of the trailer are as follows. For hauling smaller equipment without flanged wheels, the rear subframe assembly is closed down to its narrowest width. That is done by operating air cylinder 31 to draw frame members 18 and wheels 19 together until the inner stops (not shown) are reached. This adjustment is best made with the trailer in an unloaded condition and rolling slowly. Gauge blocks 32 and stop rod 33 can be in either position when the trailer is closed down to the narrow width. In the narrow position, frame members 18 are spaced closer together than rails 16, as best illustrated in FIG. 2, and rail equipment cannot be carried on the subframe assembly.

To move the sub frame assembly to its widest width, air cylinder 31 is actuated to push frame members 18 apart, with gauge blocks 32 in their retracted position and stop rod 33 in its storage position. This adjustment is also best made with the trailer unloaded and rolling slowly. In the wide position, frame members 18 are spaced farther apart than rails 16, as best seen in FIG. 3, and rail equipment cannot be carried on the sub frame assembly.

To move the subframe assembly to the intermediate width for carrying rail equipment, the trailer is first set to a width narrower than the intermediate width so that gauge blocks 32 can be moved to their extended position and rod 33 can be mounted in blocks 36, 37. Thereafter the cylinder is operated to drive the frame members apart until the gauge blocks engage the main frame and the enlarged end portions of the rod engage blocks 36, 37 to limit lateral travel of the frame members and align the frame members with the deck rails, as best seen in FIG. 4. The frame members are retained in this position by the force of the cylinder acting against the gauge blocks and the stop rod.

To load rail equipment onto or off of the trailer, the trailer is set to the proper width and driven onto the railroad tracks 42, with rails 16 and frame members 18 aligned directly above the track rails. The gooseneck is then disconnected from the towing vehicle, and the front portion of the deck section is lowered onto the tracks. The gooseneck is then disconnected from the deck section, and the inclined ramp assembly 41 is attached to the front of the trailer. The rail equipment is then driven or rolled onto or off of the trailer via the inclined ramp.

Once the equipment has been loaded or unloaded, the ramp assembly is removed, the gooseneck is reattached, and the trailer is reconnected to the towing vehicle and driven away.

The invention has a number of important features and advantages. The trailer can be used for hauling both rail equipment and other types of equipment, and it can be adjusted in width in accordance with the load to be carried. It permits rail equipment to extend the full length of the trailer, and enables the trailer to carry larger equipment than would be possible with only the rails in the deck section.

It is apparent from the foregoing that a new and improved trailer has been provided. While only certain presently preferred embodiments have been described in detail, as will be apparent to those familiar with the art, certain changes and modifications can be made without departing from the scope of the invention as defined by the following claims.

I claim:

1. In a trailer for hauling different loads including railroad equipment with flanged wheels: a main frame having a horizontally extending deck with a pair of longitudinally extending rails carried by the deck and spaced a predetermined distance apart for receiving flanged wheels of railroad equipment, a subframe assembly connected to the main frame and having ground engaging wheels and a pair of longitudinally extending frame members supported by the wheels at the rear of the main frame, and means for setting the subframe assembly to a first width in which the frame members are spaced the same distance apart as the rails and form continuations of the rails for receiving the flanged wheels of railroad equipment, a second width in which the frame members are spaced closer together than the rails, and a third width in which the frame members are spaced farther apart than the rails, and gauge blocks pivotally mounted between the main frame and the subframe assembly for movement between an extended position for holding the subframe assembly at the first width and a retracted position in which the subframe assembly is free for movement to one of the other widths.

2. The trailer of claim 1 including an operating cylinder connected between the frame members for moving the frame members between the first, second and third widths.

3. The trailer of claim 1 wherein the subframe assembly includes a telescoping cross member connected between the frame members, and a stop engagable with the cross member for holding the subframe assembly at the first width.

4. In a trailer for hauling different loads including railroad equipment with flanged wheels:
   a main frame having a horizontally extending deck with a pair of longitudinally extending rails carried by the deck and spaced a predetermined distance apart for receiving flanged wheels of railroad equipment,
   a subframe assembly connected to the main frame and having ground engaging wheels, a pair of longitudinally extending frame members supported by the wheels at the rear of the main frame, and a telescoping cross member connected between the frame members,
   means for setting the subframe assembly to a first width in which the frame members are spaced the same distance apart as the rails and form continuations of the rails for receiving the flanged wheels of railroad equipment, a second width in which the frame members are spaced closer together than the rails, and a third width in which the frame members are spaced farther apart than the rails, and
   a stop engagable with the cross member for holding the subframe assembly at the first width, said stop comprising a pair of blocks affixed to different sections of the telescoping cross member and a rod with enlarged end portions engagable with the blocks for limiting outward movement of the subframe assembly.

5. In a trailer for hauling different loads including a railroad equipment with flanged wheels; a main frame having a horizontally extending deck with a pair of longitudinally extending rails carried by the deck and spaced a predetermined distance apart for receiving flanged wheels of railroad equipment, a subframe assembly connected to the main frame and having ground engaging wheels and a pair of longitudinally extending frame members supported by the wheels at the rear of the main frame, front portions of the frame members being downwardly inclined and extending beneath the deck, with tapered bridge members on the upper sides of the frame members providing a smooth transition between the upper surfaces of the frame members and the rails, and means for setting the subframe assembly to a first width in which the frame members are spaced the same distance apart as the rails and form continuations of the rails for receiving the flanged wheels of railroad equipment, a second width in which the frame members are spaced closer together than the rails, and a third width in which the frame members are spaced farther apart than the rails.

6. In a trailer for hauling railroad equipment with flanged wheels: a main frame having a horizontally extending deck and a pair of longitudinally extending rails on the deck for receiving flanged wheels of railroad equipment, and a laterally extensible rear subframe assembly connected to the main frame for movement between different widths for different loads, said rear subframe assembly having a pair of longitudinally extending rail members which are aligned with the rails on the main frame to form an extension of the rails when the subframe assembly is set at a predetermined width, front portions of the rail members being downwardly inclined and extending beneath the deck, with tapered bridge members on the upper sides of the rail members providing a smooth transition between the upper surfaces of the rail members and the rails on the main frame.

7. The trailer of claim 6 wherein the rail members are frame members of the subframe assembly.

8. In a trailer for hauling railroad equipment with flanged wheels: a main frame having a horizontally extending deck with a pair of longitudinally extending rails on the deck for receiving flanged wheels of railroad equipment, a laterally extensible rear subframe assembly connected to the main frame for movement between different widths for different loads, said rear subframe assembly having a pair of longitudinally extending rail members which are aligned with the rails on the main frame to form an extension of the rails when the subframe assembly is set at a predetermined width, and gauge blocks engagable laterally between the main frame and the subframe assembly for setting the subframe assembly to the predetermined width with the rail members of the subframe assembly aligned with the rails on the main frame.

9. In a trailer for hauling railroad equipment with flanged wheels; a main frame having a horizontally extending deck with a pair of longitudinally extending rails on the deck for receiving flanged wheels of railroad equipment, a gooseneck assembly removably attached to the front portion of the main frame for connecting the trailer to a towing vehicle, a pair of inclined ramps which are attached to the front portion of the main frame when the gooseneck assembly is removed to form continuations of the rails on the main frame which can be aligned with the rails of a railroad track for transferring equipment between the track and the rails on the main frame, a laterally extensible rear subframe assembly connected to the main frame and having a pair of longitudinally extending frame members which can be set to different widths for different loads, and means for setting the subframe assembly at a predetermined width in which the frame members are aligned with the rails on the main frame and adapted to receive the flanged wheels of railroad equipment carried by the trailer, said means including a gauge block pivotally mounted on the main frame for movement between a rest position out of engagement with the subframe assembly and a gauging position in engagement with the subframe assembly.

10. In a trailer for hauling railroad equipment with flanged wheels: a main frame having a horizontally extending deck with a pair of longitudinally extending rails on the upper side thereof for receiving flanged wheels of railroad equipment, a pair of longitudinally extending frame members connected to the main frame and supported by ground engaging wheels at the rear of the deck, telescoping cross members interconnecting the frame members for movement laterally between widely and narrowly spaced positions, an actuator connected between the frame members for moving the frame members between the widely and narrowly spaced positions, selectively engagable means for locking the frame members in an intermediate position in which the frame members are aligned with the rails, and bridge rails affixed to front portions of the frame members providing a smooth transition between the frame members and the rails when the frame members are aligned with the rails.

11. In a trailer for hauling railroad equipment with flanged wheels:
- a main frame having a horizontally extending deck with a pair of longitudinally extending rails on the upper side thereof for receiving flanged wheels of railroad equipment,
- a pair of longitudinally extending frame members connected to the main frame and supported by ground engaging wheels at the rear of the deck,
- telescoping cross members interconnecting the frame members for movement laterally between widely and narrowly spaced positions,
- an actuator connected between the frame members for moving the frame members between the widely and narrowly spaced positions,
- selectively engagable means for locking the frame members in an intermediate position in which the frame members are aligned with the rails, said means including gauge blocks pivotally mounted to outer sides of the frame members for abutting engagement with the main frame to limit movement of the frame members in an outward direction when extended laterally and permitting movement of the frame members to the widely spaced position when retracted to a longitudinally extending position, and bridge rails affixed to front portions of the frame members providing a smooth transition between the frame members and the rails when the frame members are aligned with the rails.

12. In a trailer for hauling railroad equipment with flanged wheels:
- a main frame having a horizontally extending deck with a pair of longitudinally extending rails on the upper side thereof for receiving flanged wheels of railroad equipment,
- a pair of longitudinally extending frame members connected to the main frame and supported by ground engaging wheels at the rear of the deck,
- telescoping cross members interconnecting the frame members for movement laterally between widely and narrowly spaced positions,
- an actuator connected between the frame members for moving the frame members between the widely and narrowly spaced positions,
- selectively engagable means for locking the frame members in an intermediate position in which the frame members are aligned with the rails, said means including a pair of blocks affixed to different sections of one of the cross members and a rod with enlarged end portions engagable with the blocks for limiting outward movement of the frame members, and
- bridge rails affixed to front portions of the frame members providing a smooth transition between the frame members and the rails when the frame members are aligned with the rails.

* * * * *